United States Patent
Tseng et al.

(10) Patent No.: US 12,429,078 B2
(45) Date of Patent: *Sep. 30, 2025

(54) FIXING DEVICE

(71) Applicant: HANWIT PRECISION INDUSTRIES LTD., New Taipei (TW)

(72) Inventors: Ying-Chih Tseng, New Taipei (TW); Ming-De Wu, New Taipei (TW); Ching-Kai Chang, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 97 days.

This patent is subject to a terminal disclaimer.

(21) Appl. No.: 18/484,583

(22) Filed: Oct. 11, 2023

(65) Prior Publication Data

US 2024/0209880 A1    Jun. 27, 2024

Related U.S. Application Data

(63) Continuation of application No. 18/358,146, filed on Jul. 25, 2023.

(30) Foreign Application Priority Data

Dec. 23, 2022   (TW) .................................. 111214305

(51) Int. Cl.
*F16B 2/18*    (2006.01)
*F16B 5/06*    (2006.01)

(52) U.S. Cl.
CPC ............ *F16B 2/185* (2013.01); *F16B 5/0607* (2013.01)

(58) Field of Classification Search
CPC .... F16B 2/00; F16B 2/185; F16B 5/06; F16B 5/0607; F16B 5/0614; F16B 5/0621; F16B 21/02; F16B 21/04
(Continued)

(56) References Cited

U.S. PATENT DOCUMENTS

| 6,619,875 B2 * | 9/2003 | Chiang | F16B 21/165 |
| | | | 403/374.1 |
| 2012/0195711 A1 * | 8/2012 | Chiu | F16B 5/0208 |
| | | | 411/103 |

(Continued)

FOREIGN PATENT DOCUMENTS

DE    102018009976 A1 *    6/2020
TW    202126916 A *    7/2021

*Primary Examiner* — Nathan Cumar
(74) *Attorney, Agent, or Firm* — MUNCY, GEISSLER, OLDS & LOWE, P.C.

(57) ABSTRACT

A fixing device includes a docking element having a through hole on the base thereof and two fixing portions at two sides of the base for fixing to a preset first panel, a positioning mechanism, and a rotating mechanism. Turning the rotating element generates a linkage between the rotating sleeve and the positioning element, and forms a rotating and lifting displacement for the positioning sleeve set inside the rotating sleeve to generate a clamp and cause the positioning element to generate a rotating and lifting displacement. Through the positioning portion of the positioning element, it passes through the through hole of the docking element and is held against the base of the docking element to achieve a solid combination of the preset first panel and the preset second panel. It has the purpose of being stable and not easy to loosen and break away, and has the effect of easy operation.

18 Claims, 9 Drawing Sheets

(58) Field of Classification Search
USPC ..... 292/257; 411/552; 403/13, 83, 103, 104, 403/106, 111, 86, 164
See application file for complete search history.

(56) References Cited

U.S. PATENT DOCUMENTS

| | | | | |
|---|---|---|---|---|
| 2018/0058487 | A1* | 3/2018 | Wu | F16B 5/0657 |
| 2018/0065746 | A1* | 3/2018 | Jones | B64D 1/12 |
| 2019/0366940 | A1* | 12/2019 | Peters | B62J 50/225 |
| 2020/0378415 | A1* | 12/2020 | Dammermann | F16M 11/041 |
| 2021/0404212 | A1* | 12/2021 | Tseng | E05C 3/045 |
| 2022/0186758 | A1* | 6/2022 | Chang | F16B 5/0642 |

\* cited by examiner

FIXING DEVICE

CROSS REFERENCE TO THE RELATED APPLICATIONS

This application is a Continuation of co-pending application Ser. No. 18/358,146, filed on Jul. 25, 2023, for which priority is claimed under 35 U.S.C. § 120, the entire contents of all of which are hereby incorporated by reference.

This application claims the priority benefit of Taiwan patent application number 111214305, filed on Dec. 23, 2022.

BACKGROUND OF THE INVENTION

1. Field of the Invention

The present invention relates to a fixing device, especially referring to turning a rotating element to generate linkage between a rotating sleeve and a positioning element, and to form a rotating and lifting displacement for a positioning sleeve set inside the rotating sleeve to generate a clamp and cause the positioning element to generate a rotating and lifting displacement. Through a positioning portion of the positioning element, it passes through a through hole of a docking element and is held against one side of the base of the docking element to achieve a solid combination of a preset first panel and a preset second panel. It has the purpose of being stable and not easy to loosen and break away, and has the effect of easy operation.

2. Description of the Related Art

General panels (board-to-board) are assembled and joined by using positioning screws possessed of knobs, collars, and screws to lock, base on this, the screws and collars will be fixed on the panels. First turn the knob to allow the screw to be locked into the inner panel to form a preset position, and then use a hand tool to lock the screw, so that the outer panel and the inner panel are locked into one. This kind of locking method of multi-layer boards is used for boards that can be used in machine tools or other board-to-board connections. However, there are the following deficiencies that need to be improved urgently during the operation process through the locking method described above:

1. These machine tools need to use panels to lock joints, most of which are power devices or speed adjustment devices, and various power devices and speed adjustment devices are located inside the space formed by the tool shell, which can be assembled, locked, disassembled. When the power device breaks down, crashes or is damaged, or the speed adjustment device changes or adjusts the speed, remove the panels for related maintenance and adjustment operations. The panels are locked with a plurality of positioning screws. Therefore, it is easy to cause the positioning screws to fall off or be lost during the disassembly process, and the panels cannot be re-locked back to their original position, which will affect the inconvenience and trouble of assembly and disassembly operations, and then affect the stability and quality of the assembly process.

2. Under the requirement of modularized mass production and processing efficiency nowadays, the cumbersome manual assembly process using screws will seriously affect the progress of the manufacturer's shipment. Moreover, due to the small size of the screws, the screws are easy to lose during the process of locking the two panels, and due to the difference in the size of the screw holes at the position where the screws are locked or the number of teeth and the pitch of the screw holes do not match, it is easy to cause difficulties in assembly, alignment or locking. Moreover, the space available for operating screws between the two opposite panels is quite narrow, and the assembly and disassembly of the screws are easily hindered by surrounding objects. Not only is it time-consuming and inconvenient, but it is more cost in overall production, which in turn will increase the burden on the industry.

It can be seen from the above that the above-mentioned fixing devices still have poor assembly efficiency, are prone to loss, etc., and there is room for improvement, which is the key point to be studied and improved by those who are engaged in this industry.

SUMMARY OF THE INVENTION

Therefore, in view of the above-mentioned problems and deficiencies, the inventor has collected the relevant information, evaluated and considered it in many ways, and based on years of experience accumulated in this industry, through continuous trial and modification, they innovatively designed such a fixing device.

The main object of the present invention is to provide a fixing device, where the rotating sleeve is set on the positioning sleeve, and there are convex portions and stoppers in the accommodating space of the rotating sleeve, and a channel is formed between each convex portion and each stopper. As a result, the locking portions of the positioning sleeve are moved up and down from each notch along the edge of each convex portion to each channel by using the rotating sleeve, and the locking portions touch the stoppers to form a rotation stop so that the rotating sleeve is linked with the positioning portion of the positioning element to produce a rotating lift to pass through the through hole of the docking element into the positioning space and form a support against one side of the base of the docking element. In this way, the preset first panel and the preset second panel can be firmly integrated into one body. It has the purpose of being stable and not easy to loosen and disengage, and it does not need to use any hand tools. It only needs to achieve time-saving and labor-saving effects through simple and easy operation.

Another object of the present invention is that the rotating element of the rotating mechanism is assembled on the pivot joint of the rotating sleeve, and comprises a wrenching portion, two opposing extension arms extending from one side of the wrenching portion in the same direction, a wrenching space formed between the two opposing extension arms, and two through-shaped pivot holes respectively formed on the opposing walls of the extension arms in communication with the wrenching space. Then, use the pivoting element of the rotating mechanism to penetrate each through-shaped pivot hole, each pivot joint groove and perforation respectively, so that the rotating element forms an active pivot state. This provides users with simple and fast labor-saving effect on operation intuition, and can also produce pivotal bending to save space.

Still, another object of the present invention is that the rotating element can only be rotated back and forth in one direction in the direction of turning in, so that the user has an obvious difference in the operating feel, and the user can easily identify and judge whether the positioning mechanism is in a combined state or a disengaged state by whether it can be rotated clockwise or counterclockwise. In this way, it further has a good anti-fooling effect, so as to achieve the effect of improving the convenience and fluency of installation or disassembly.

DETAILED DESCRIPTION OF THE PREFERRED EMBODIMENT

In order to achieve the above objects and effect, the technical means used in the present invention and its structure, implementation method, etc., the preferred embodiment of the present invention is hereby described in detail and its features and functions are as follows, so as to be fully understood.

Figure 1:
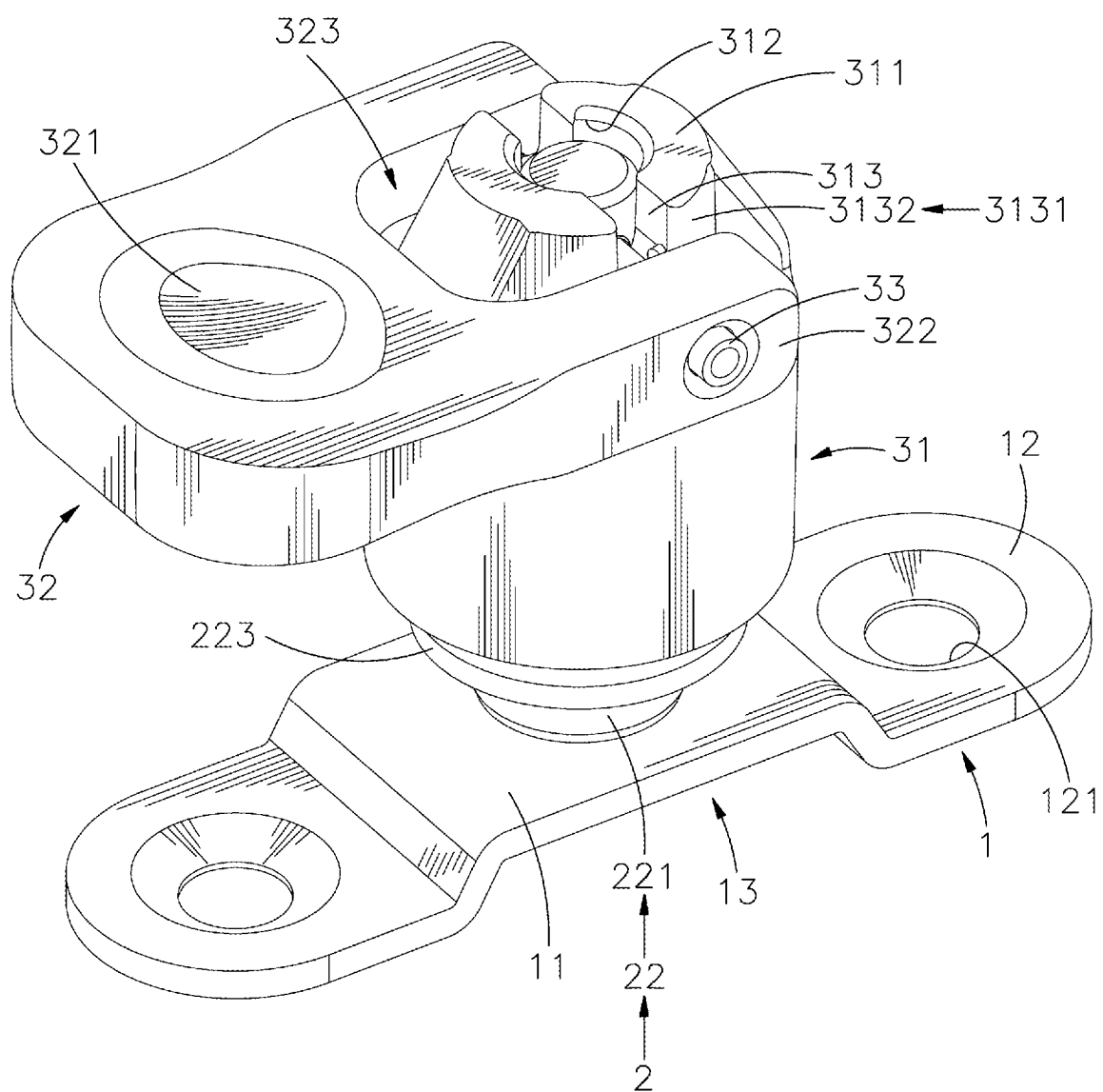
FIG. 1 is an oblique top elevation view of the present invention.
Figure 2:
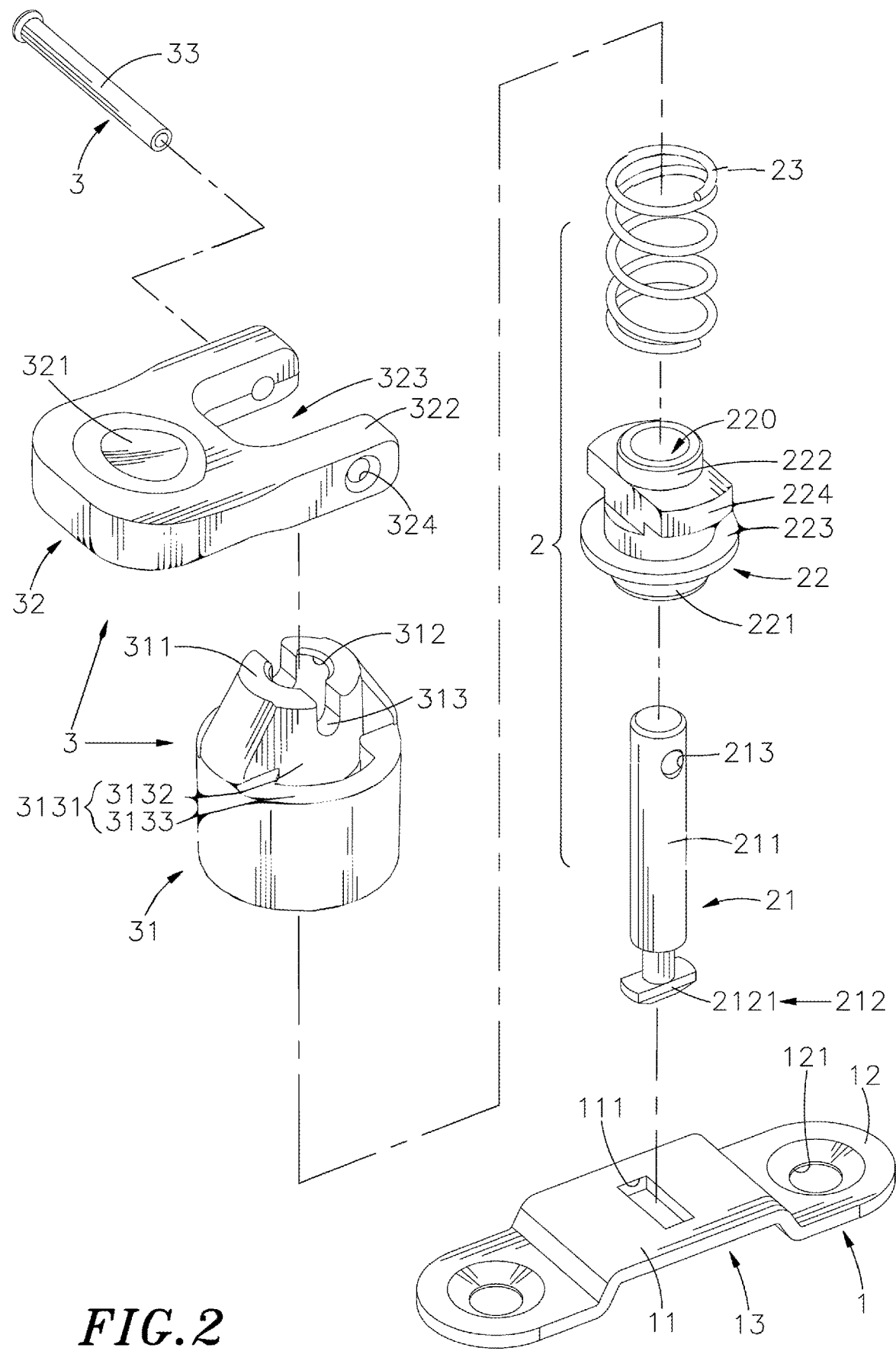
FIG. 2 is an exploded view of the present invention.
Figure 3:
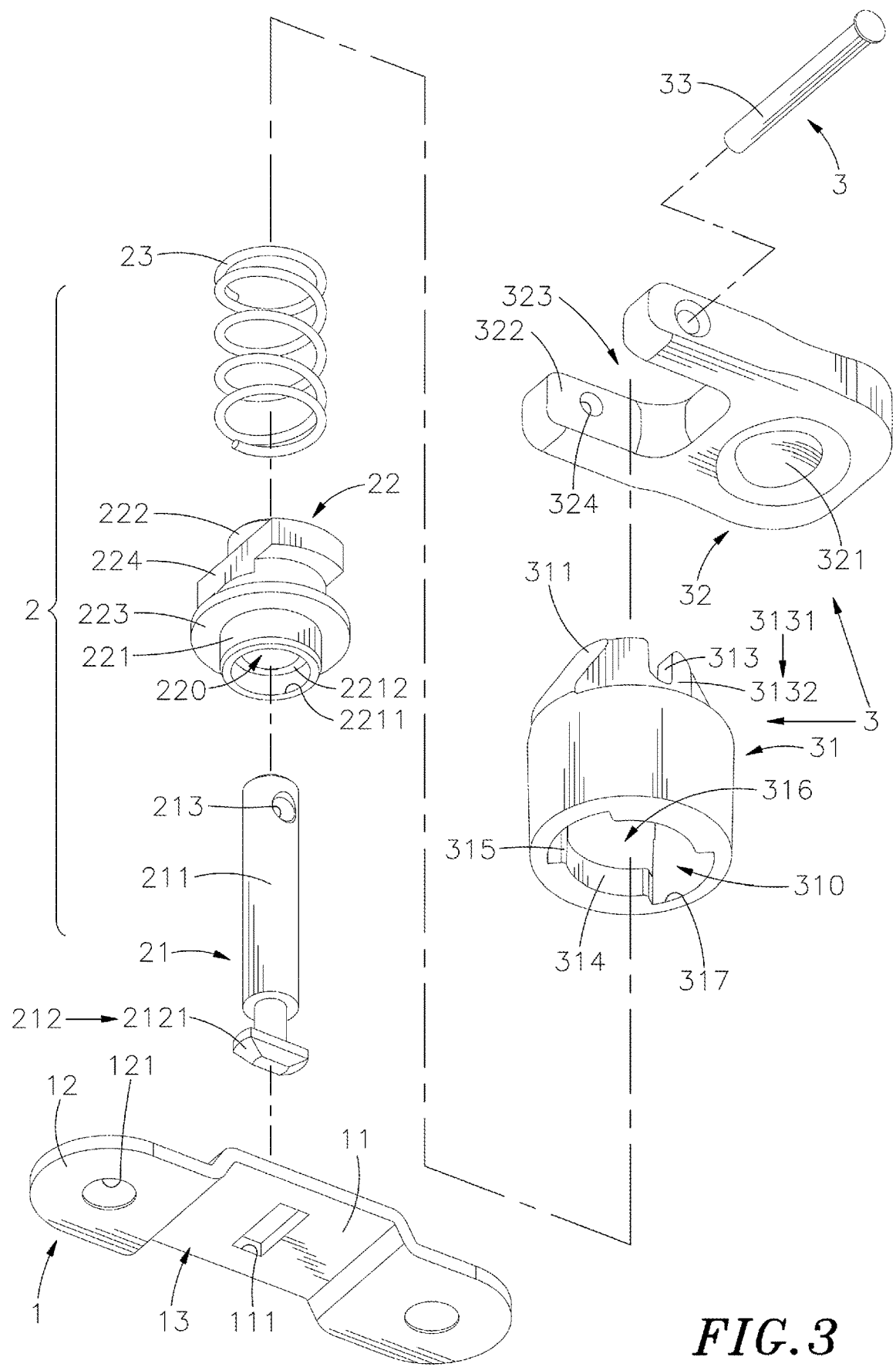
FIG. 3 is another exploded view of the present invention.
Figure 4:
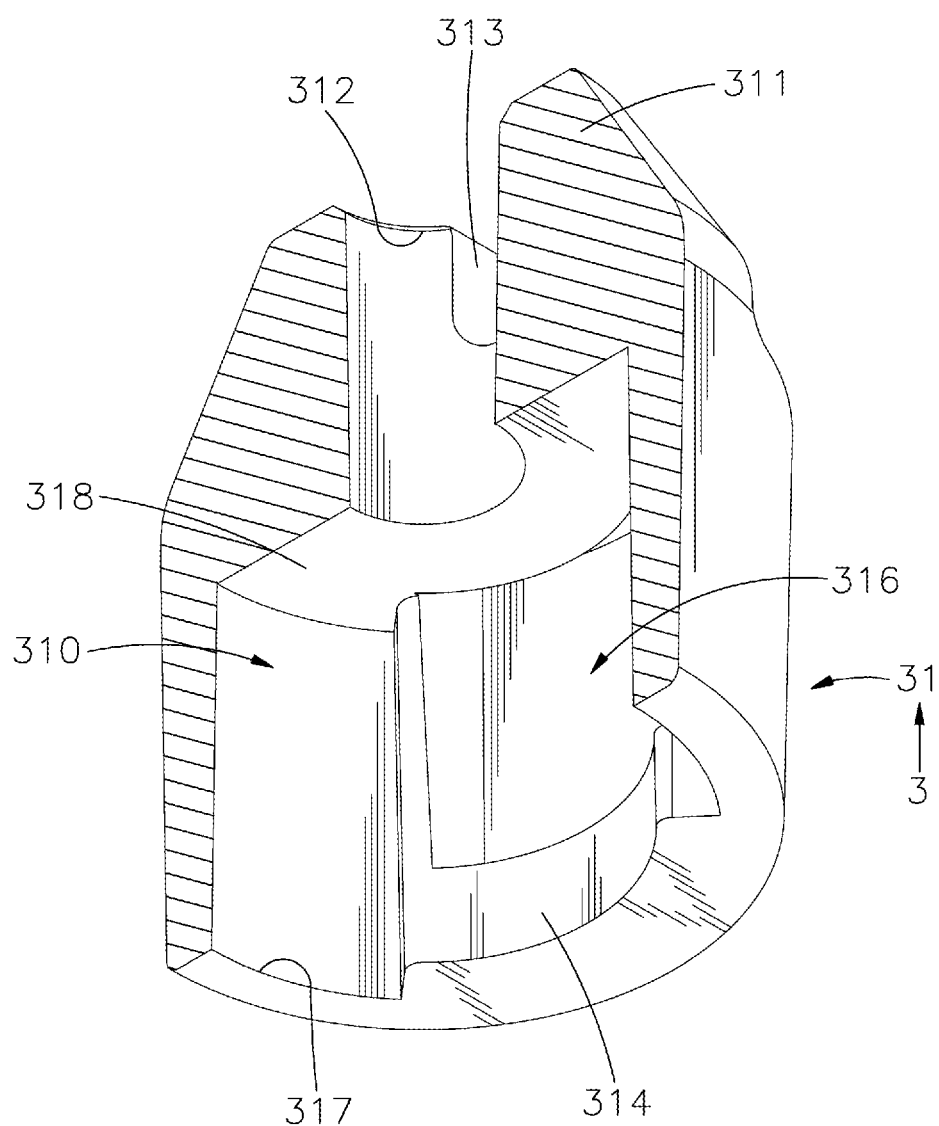
FIG. 4 is a sectional elevation view of the rotating sleeve of the present invention.

Please refer to FIGS. 1, 2, 3, and 4, which are an oblique top elevation view of the present invention, an exploded view of the present invention, another exploded view of the present invention, and a sectional elevation view of the rotating sleeve of the present invention.

It can be clearly seen from the drawings that the fixing device of the present invention comprises a docking element 1, a positioning mechanism 2, and a rotating mechanism 3.

The docking element 1 comprises a base 11, a long rectangular through hole 111 provided on the surface of the base 11, two fixing portions 12 respectively and obliquely extending from two opposite sides of the base 11, a fixing hole 121 respectively provided on the surface of each of the two fixing portions 12 for fixing on a preset first panel 4, and a positioning space 13 formed between one side of the through hole 111, which is between the two fixing portions 12, and the preset first panel 4.

The positioning mechanism 2 is assembled on the base 11 of the docking element 1 and comprises a positioning element 21, a positioning sleeve 22, and an elastic element 23. The positioning element 21 has a shank 211, a positioning portion 212 located on one end of the shank 211 and movably worn on the through hole 111 of the docking element 1 to be located in the positioning space 13 for rotational alignment and lifting displacement, a long rectangular stop block 2121 provided with the positioning portion 212 corresponding to the through hole 111, and a perforation 213 provided in a transverse direction on the other end of the shank 211 opposite to the positioning portion 212.

Based on the above, the positioning sleeve 22 is movably sleeved onto the positioning element 21. The positioning sleeve 22 comprises a sliding space 220 therein for the positioning element 21 to insert and move, a tube-shaped fitting portion 221 with an enlarged outer diameter externally protruded from one end of the sliding space 220 to be fixed in a fitting hole 50 of a preset second panel 5, a tube-shaped sleeve portion 222 externally protruded from an opposite end of the sliding space 220 to be sleeved with the elastic element 23, a storage groove 2211 with an enlarged aperture recessed on the surface of the tube-shaped fitting portion 221 in communication with the sliding space 220 for receiving the positioning portion 212 of the positioning element 21, a limiting shoulder 2212 formed at the adjacent position of the sliding space 220 and the storage groove 2211 to limit the positioning portion 212 from detaching from the tube-shaped sleeve portion 222, a disc-shaped resisting portion 223 provided on the outside of the tube-shaped fitting portion 221 for the preset second panel 5 to resist and limit when it is applied, and two opposing protruding rectangular locking portions 224 provided on the outside of the tube-shaped sleeve portion 222. The surface of one side of the rectangular locking portions 224 is used for one end of the elastic element 23 to form a resisting effect. The tube-shaped fitting portion 221 is pushed in along the direction of the shank 211 of the positioning element 21 through the sliding space 220 at the storage groove 2211, so that the positioning sleeve 22 is movably worn outside the positioning element 21.

The rotating mechanism 3 is assembled on the positioning mechanism 2 and comprises a rotating sleeve 31 movably mounted on the positioning element 21 and the positioning sleeve 22, a rotating element 32 movably assembled on the rotating sleeve 31, and a pivoting element 33 movably inserted between the positioning element 21 and the rotating sleeve 31 and the rotating element 32. The rotating sleeve 31 comprises an accommodating space 310 concavely formed therein, a pivot joint 311 provided on one side thereof opposite to the accommodating space 310 for the pivoting of the rotating element 32, a through hole 312 located on the side of the accommodating space 310 towards the pivot joint 311 for the positioning element 21 of the positioning mechanism 2 to be movably inserted, two pivot joint grooves 313 respectively recessed on the surface of the through hole 312 on two opposite sides of the pivot joint 311, two pivot joint grooves 313 respectively recessed on the surface of the pivot joint 311 on two opposite sides of the through hole 312, two opposite convex portions 314 arranged transversely on two opposite wall surfaces of the accommodating space 310 remote from the pivot joint 311, opposing stoppers 315 respectively longitudinally provided with each convex portion 314 at the junctions, a channel 316 formed between each convex portion 314 and each stopper 315 for the rectangular locking portions 224 of the positioning sleeve 22 to rotate and penetrate, a notch 317 respectively formed on an outer side of each stopper for the rectangular locking portions 224 to be rotated and aligned for lifting and displacement, and a supporting shoulder 318 formed at the inner wall surface thereof between the accommodating space 310 and the pivot joint 311 for the other end of the elastic element 23 to form a supporting function.

Based on the above, the rotating element 32 is assembled on the pivot joint 311 of the rotating sleeve 31, and comprises a wrenching portion 321, two opposing extension arms 322 extending from one side of the wrenching portion 321 in the same direction, a wrenching space 323 formed between the two opposing extension arms 322, and two through-shaped pivot holes 324 respectively formed on the walls of the extension arms 322 in communication with the wrenching space 323.

When the above-mentioned components are assembled, the docking element 1 is first fixed on the preset first panel 4 through each fixing hole 121, and then push the other side, relatives to the positioning portion 212, of the positioning element 21 into the sliding space 220 in the direction of the tube-shaped fitting portion 221 of the positioning sleeve 22 to form a movable wear. At this time, the limiting shoulder 2212 of the tube-shaped fitting portion 221 is used for the positioning portion 212 to form a side limit. Then the tube-shaped sleeve portion 222 is sleeved with the elastic element 23, so that the positioning sleeve 22 is movable and placed outside the positioning element 21. Then, the rotating sleeve 31 of the rotating mechanism 3 is aligned along the direction of the shank 211 of the positioning element 21 through the other side of the accommodating space 310 relative to the pivot joint 311, and the notches 317 of the rotating sleeve 31 are respectively aligned with the rectangular locking portions 224 of the positioning sleeve 22 after pushing in, to form the rotating sleeve 31 to fit on the positioning mechanism 2, so that one end of the elastic element 23 is held against the surface of the rectangular locking portions 224, and the other end is held against the supporting shoulder 318 of the rotating sleeve 31. After the positioning element 21 of the positioning mechanism 2 extends into the through hole 312 of the rotating sleeve 31, the pivot joint grooves 313 of the rotating sleeve 31 are respectively aligned with the perforation 213 of the positioning element 21, and the through-shaped pivot holes 324 of the rotating element 32 of the rotating mechanism 3 are respectively aligned with the perforation 213 of the positioning element 21 on the outside of the other side relative to the pivot joint grooves 313. Then, the pivoting element 33 is inserted through each through-shaped pivot hole 324, each pivot joint groove 313, and the perforation 213. Then, the tube-shaped fitting portion 221 of the positioning sleeve 22 of the positioning mechanism 2 is fixed in the preset fitting hole 50 of the preset second panel 5, and then the positioning portion 212 of the positioning element 21 of the positioning mechanism 2 is rotated along the through hole 111 of the docking element 1 and placed in the positioning space 13 to form the positioning mechanism 2 assembled to the docking element 1. In this way, the docking element 1, the positioning mechanism 2, and the rotating mechanism 3 constitute the fixing device of the present invention.

In addition, the through hole 111 of the above-mentioned docking element 1 and the stop block 2121 of the positioning portion 212 of the positioning element 21 are in the shape of a long rectangle, and can also be triangular, trapezoidal, rhombus or irregular, so that the positioning portion 212 of the positioning element 21 can be held in the positioning space 13 through the through hole 111 of the docking element 1 during actual application and implementation. When the fixing holes 121 of the docking element 1 are combined with the preset first panel 4, they can be firmly combined by locking, riveting, welding, etc. Moreover, the pivot joint grooves 313 of the rotating sleeve 31 can also be holes through which the rotating element 32 can generate a pivoting state during actual application and implementation. Thus, pull the rotating element 32 can form a linkage with the rotating sleeve 31 and the positioning element 21. The positioning element 21 is in the shape of a rod, and the positioning sleeve 22 movably sleeved on the positioning element 21 is in the shape of a tube.

Figure 5:
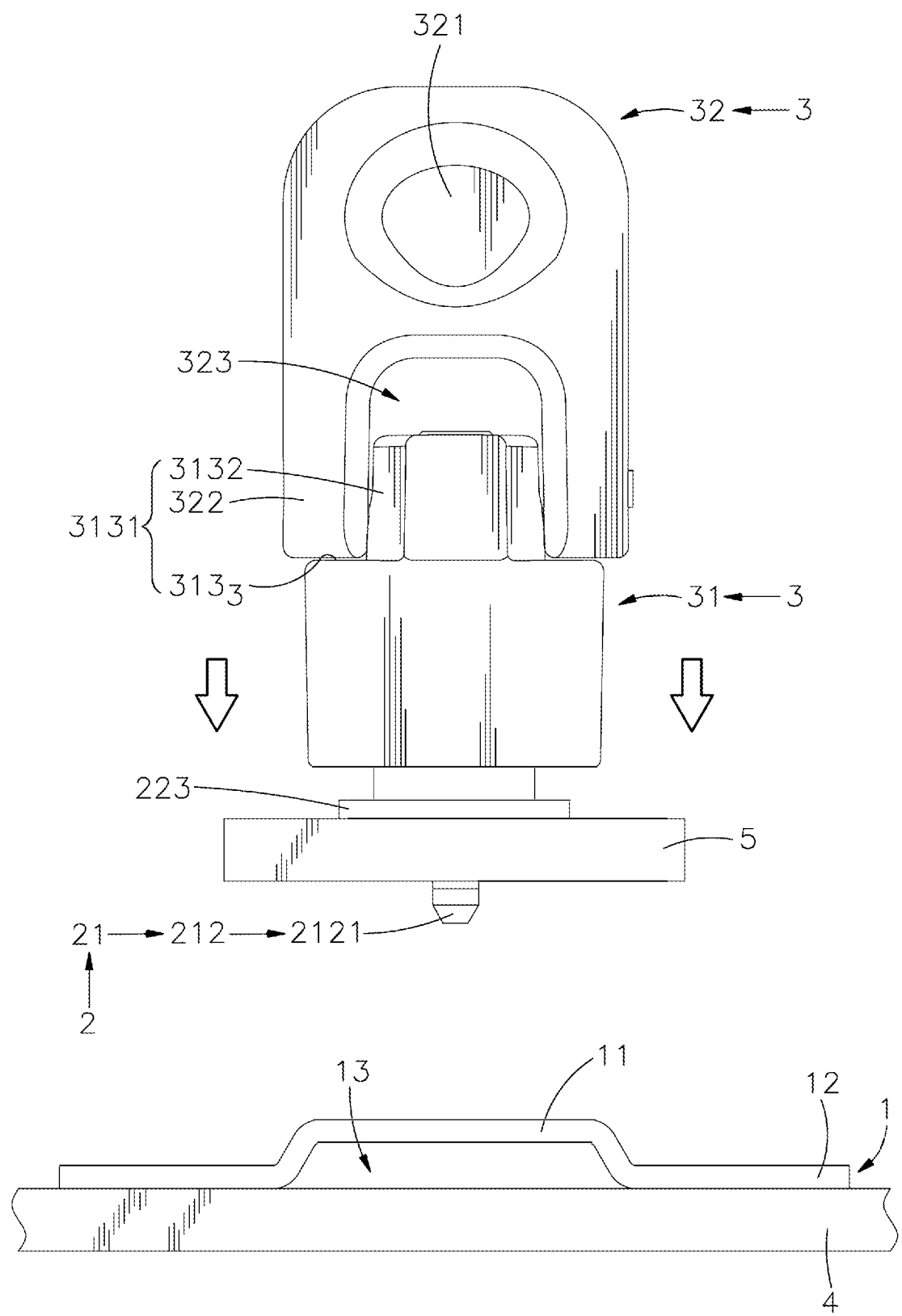
FIG. 5 is the side view (I) of the action of the present invention.
Figure 6:
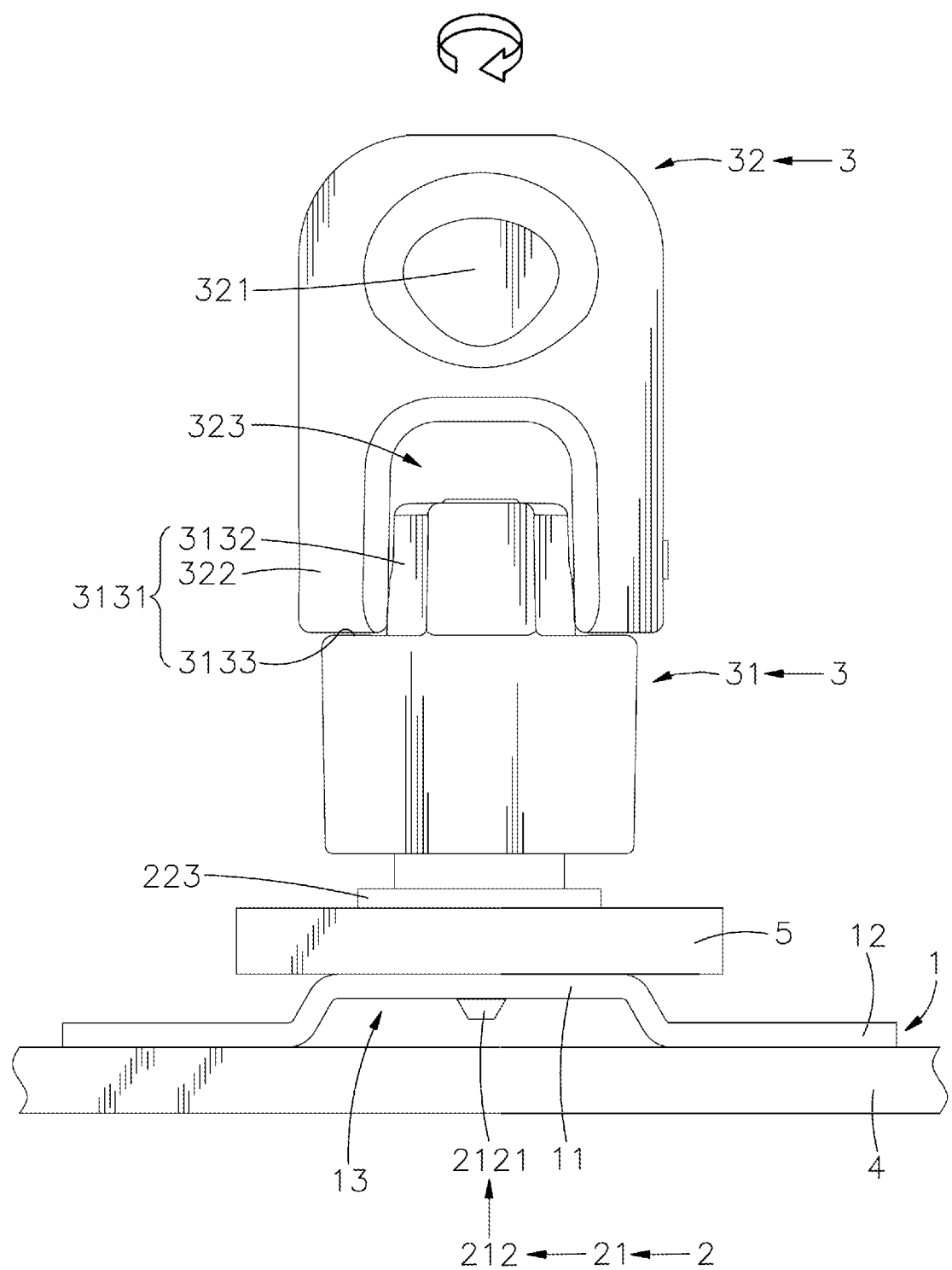
FIG. 6 is the side view (II) of the action of the present invention.
Figure 7:
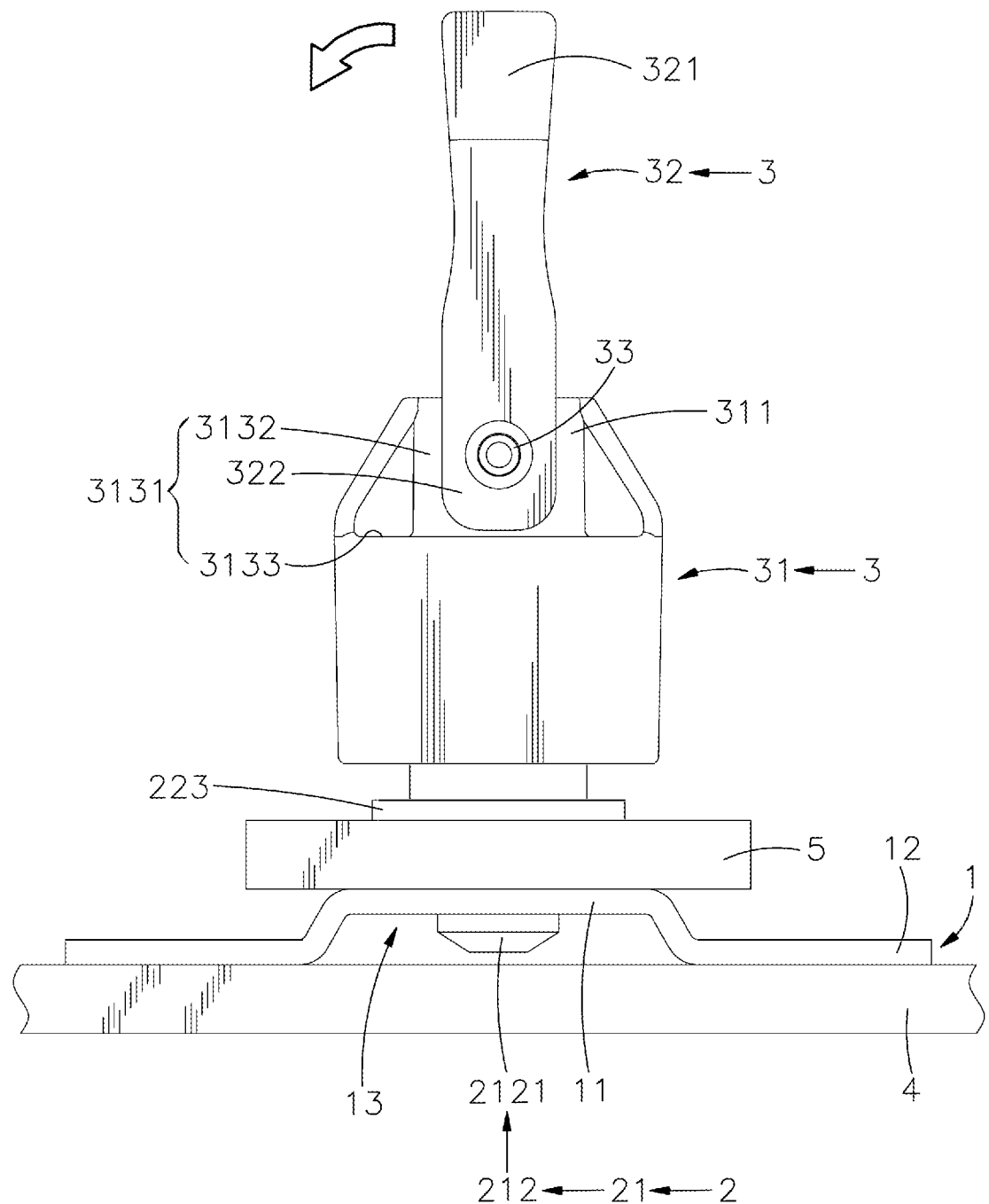
FIG. 7 is the side view (III) of the action of the present invention.
Figure 8:
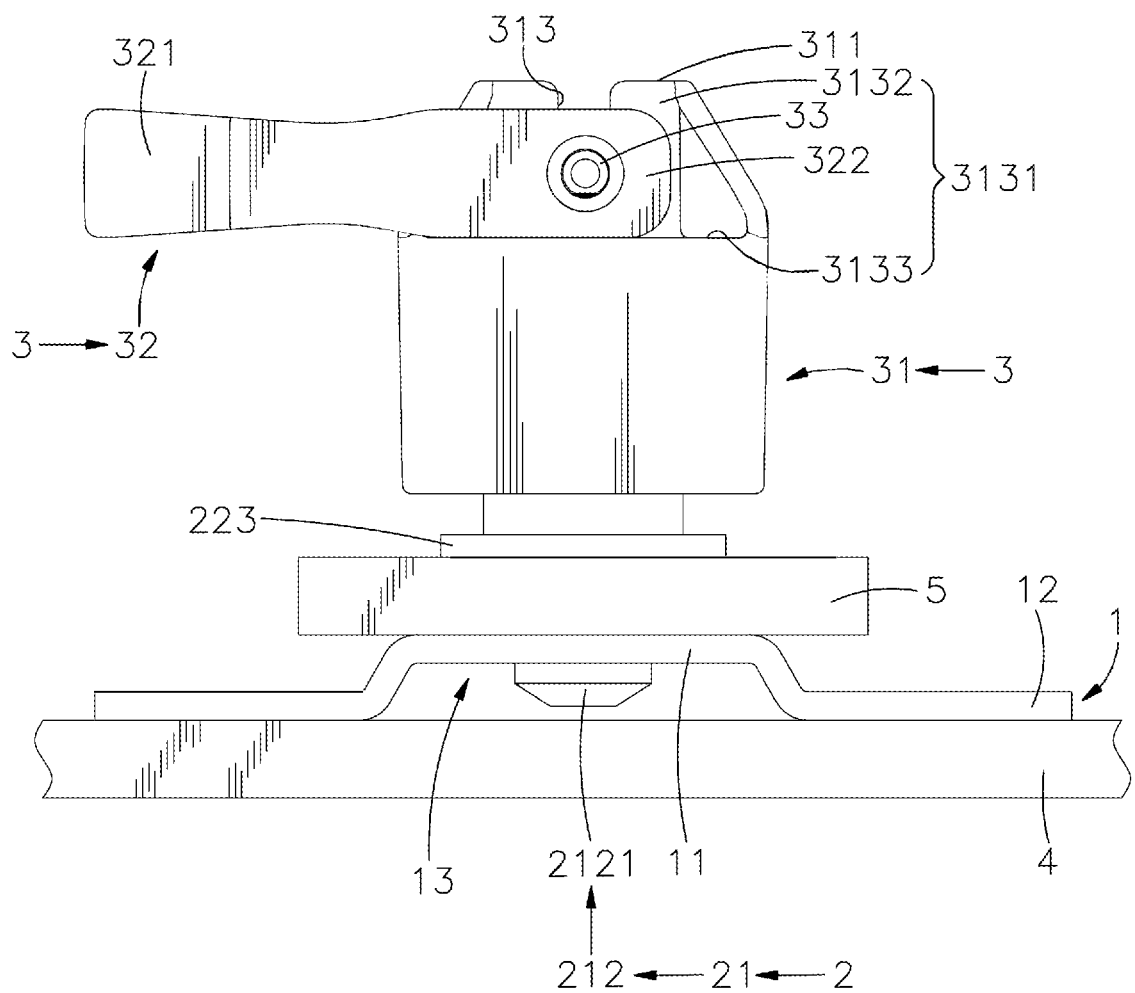
FIG. 8 is the side view (1V) of the action of the present invention.
Figure 9:
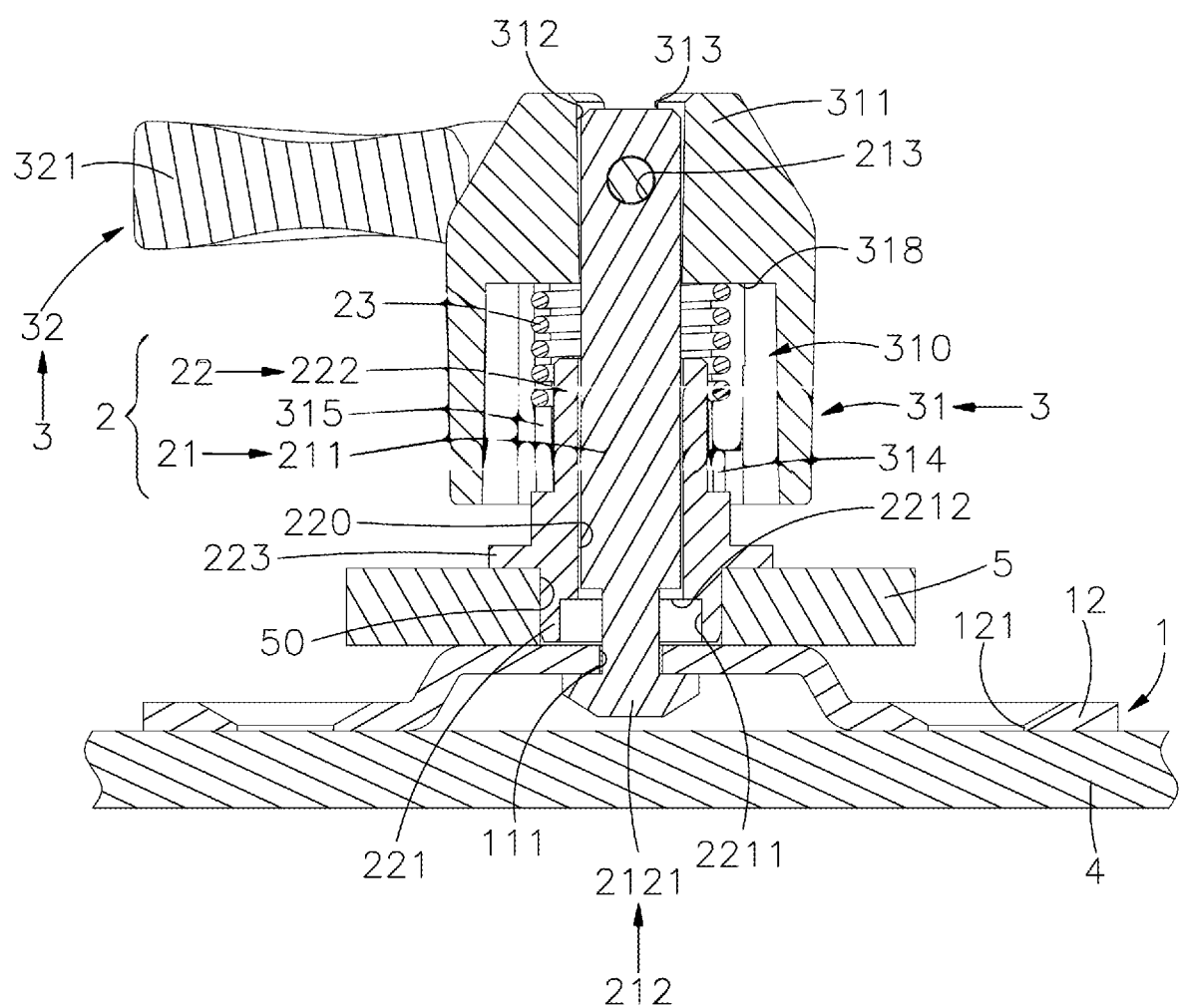
FIG. 9 is a sectional side view of the present invention.

Please refer to FIGS. 5, 6, 7, 8, and 9, which are the side view (I) of the action of the present invention, the side view (II) of the action of the present invention, the side view (III) of the action of the present invention, the side view (IV) of the action of the present invention, and the sectional side view of the present invention. It can be clearly seen from the drawings that the fixing device of the present invention is fixed on the preset first panel 4 through the docking element 1 during actual application and implementation. The positioning sleeve 22 of positioning mechanism 2 is fixed on the preset second panel 5, and the docking element 1 is used for the positioning mechanism 2 and the rotating mechanism 3 to be assembled on the docking element 1. By applying force to the rotating sleeve 31 in the direction of the positioning sleeve 22 to form a lifting displacement, the elastic element 23 is elastically squeezed. Then, rotate the rotating element 32 of the rotating mechanism 3 (rotation is about 90 degrees) to simultaneously drive the rotating sleeve 31 and the positioning element 21 to generate axial rotation. By means of rotation and lifting of the rotating sleeve 31, the rectangular locking portions 224 of the positioning sleeve 22 located in the accommodating space 310 of the rotating sleeve 31 are moved from the notches 317 to the channels 316 along the edges of the convex portions 314. After the rectangular locking portions 224 touch the stoppers 315, a rotation stop is formed. Then put the positioning portion 212 of the positioning element 21 of the positioning mechanism 2 into the positioning space 13 along the through hole 111 of the docking element 1. Through the rotating sleeve 31 to generate the rotation and lifting, the stop block 2121 of the positioning portion 212 of the positioning element 21 passes through the through hole 111 of the docking element 1 to the positioning space 13. Then through the rotating element 32 to generate rotation (rotation is about 90 degrees), the stop block 2121 is held against the surface of side of the base 11 of the docking element 1. In this way, the preset first panel 4 and the preset second panel 5 can be firmly integrated into one body that is stable and not easy to loosen or fall apart. The rotating element 32 generates a pivoting state through the pivoting element 33, and can also generate pivotal bending to save space.

If you want to release the combined state of the preset first panel 4 and the preset second panel 5, you must turn the rotating element 32 of rotating mechanism 3 again to rotate in the opposite direction (reverse rotation is about 90 degrees), and then drive the rotating sleeve 31 and the positioning element 21 to produce a backward axial rotation at the same time. As a result, the rectangular locking portions 224 of the positioning sleeve 22 located in the accommodating space 310 of the rotating sleeve 31 are reversely rotated through the rotating sleeve 31 to move from each channel 316 to each notch 317 along the edge of each convex portion 314, and the elastic element 23 is elastically released, so that the rotating sleeve 31 produces a reverse lifting displacement, and then the stop block 2121 of the positioning portion 212 of the positioning element 21 is linked to generate a reverse rotation lifting through the rotating element 32 (the reverse rotation is about 90 degrees), and no resistance is formed on the surface of one side of the base 11 of the docking element 1. Then through the rotating sleeve 31 to generate reverse rotation lift, the stop block 2121 of the positioning portion 212 of the positioning element 21 passes back through the through hole 111 of the docking element 1 to the storage groove 2211, so as not to have a resistance effect. The preset first panel 4 can then be separated from the preset second panel 5, and the preset first panel 4 and the preset second panel 5 can be combined firmly again, so as to achieve the convenience and rapid assembly of the preset first panel 4 and the preset second panel 5 with bare hands. It can effectively save operation time, reduce preparatory work and complicated steps.

Therefore, the present invention has the following advantages:

1. By turning the rotating mechanism 3, the positioning element 21 of the positioning mechanism 2 is driven to rotate to form a resisting effect, and the rectangular locking portions 224 of the positioning sleeve 22 of the positioning mechanism 2 are used to form a holding effect. In this way, the positioning element 21 is driven to vertically move up and down in the positioning sleeve 22 in a rotating manner. It does not need to use any hand tools, and only needs to combine (lock) or disengage (unlock) the preset first panel 4 and the preset second panel 5 through simple and easy operations, thereby saving time and effort.

2. When it is necessary to combine or disengage a large number of preset panels, the fast operation also saves a lot of time.

3. The rotating element 32 of the rotating mechanism 3 can only be rotated back and forth in one direction in the direction of turning in, so that the user has an obvious difference in the operating feel, and the user can easily identify and judge whether the positioning mechanism 2 is in a combined state or a disengaged state by whether it can be rotated clockwise or counterclockwise. In this way, it is easy and fast for users to operate intuitively, and further has a good anti-fooling effect, so as to achieve the effect of improving the convenience and fluency of installation or disassembly.

4. The elastic element 23 is elastically released and held against the surface of the rectangular locking portions 224 of the positioning sleeve 22 and the supporting shoulder 318 of the rotating sleeve 31, so that the positioning element 21 is driven to form a lifting displacement in the through hole 312 of the rotating sleeve 31. In this way, the rotating element 32 of the rotating mechanism 3 is positioned outside the pivot joint 311 when the rotating element 32 is in a vertical or horizontal state through the linkage of the positioning element 21.

The description is only a preferred embodiment of the present invention and does not limit the patent scope of the present invention. Therefore, all simple modifications and equivalent structural changes made by using the description and drawings of the present invention should be included in the patent scope of the present invention in the same way.

To sum up, the fixing device of the present invention can indeed achieve its function and purpose when used. Therefore, the present invention is indeed an invention with excellent practicability. In order to meet the requirements for the application of new patents, an application is filed in accordance with the law. I hope that the review committee will approve this case as soon as possible to protect the hard work of the inventor. If the review committee has any doubts, please feel free to send us a letter to instruct, and the inventor will do his best to cooperate.

What the invention claimed is:

1. A fixing device, comprising a positioning mechanism and a rotating mechanism, wherein:

said positioning mechanism comprises a positioning element, a positioning sleeve and an elastic element, said positioning element comprising a positioning portion located on one end thereof and a perforation provided on an opposite end thereof opposite to said positioning portion, said positioning sleeve being movably sleeved onto said positioning element, said positioning sleeve comprising a sliding space therein for said positioning element to move through and wear, a fitting portion externally protruded from one end of said sliding space, a sleeve portion externally protruded from an opposite end of said sliding space to be sleeved with said elastic element, and two locking portions externally provided adjacent to said fitting portion;

said rotating mechanism is assembled on said positioning mechanism and comprises a rotating sleeve movably mounted on said positioning element and said positioning sleeve, a rotating element movably assembled on said rotating sleeve, and a pivoting element movably inserted between said positioning element and said rotating sleeve and said rotating element, said rotating sleeve comprising an accommodating space therein for said positioning element of said positioning mechanism to be movably inserted, a pivot joint provided on the outside for the pivoting of said rotating element, two pivot joint grooves respectively recessed on said pivot joint on two opposite sides for said pivoting element to be pivoted, wherein said positioning element is a rod-shaped configuration and further comprises a shank, and said positioning portion is located on one end of said shank and movably worn on said through hole of said docking element to be located in said positioning space for rotational alignment and lifting displacement.

2. The fixing device as claimed in claim 1, further comprises a docking element for said positioning element of said positioning mechanism to be assembled on said docking element, said docking element comprising a base with a through hole on the surface thereof for assembly of said positioning element, and a positioning space formed on one side of said through hole of said base for said positioning element to move through said through hole of said docking element.

3. The fixing device as claimed in claim 2, wherein said through hole of said docking element is a long rectangular through hole; said positioning element further comprises a long rectangular stop block provided with said positioning portion corresponding to said long rectangular through hole of said docking element; said docking element further comprises two fixing portions respectively and obliquely extending from said base two opposite sides of said through hole, a fixing hole respectively provided on the surface of each of said two fixing portions for fixing on a preset first panel.

4. The fixing device as claimed in claim 1, wherein said rotating element is movably assembled on said pivot joint of said rotating sleeve, said rotating element comprising a wrenching portion, two opposing extension arms extending from one side of said wrenching portion in the same direction, a wrenching space formed between said two opposing extension arms, and two through-shaped pivot holes respectively formed on said extension arms in communication with said wrenching space; said pivoting element is inserted through each said through-shaped pivot hole, each said pivot joint groove and said perforation, so that said rotating element forms a movable pivot state.

5. The fixing device as claimed in claim 1, wherein said rotating sleeve further comprises a supporting shoulder formed at an inner wall surface thereof between said accommodating space and said pivot joint; said elastic element is set on said sleeve portion of said positioning sleeve with one end thereof held against the surface of said locking portions and an opposite end thereof held against said supporting shoulder in an elastic deformation state; said rotating sleeve further comprises a through hole located on the side of the accommodating space towards said pivot joint for said positioning element of said positioning mechanism to be movably inserted, and the outside of said through hole is provided with a pivot portion for said rotating element to pivot.

6. The fixing device as claimed in claim 5, wherein said rotating sleeve further comprises two opposite convex portions arranged transversely on two opposite wall surfaces of said accommodating space remote from said pivot joint, two opposing stoppers respectively protruding from connection position of convex portions, a channel formed between each said convex portion and each said stopper for said locking portions of said positioning sleeve to rotate and penetrate, and a notch respectively formed on an outer side of each said stopper for said locking portions to be rotated and aligned for lifting and displacement.

7. The fixing device as claimed in claim 1, wherein said positioning sleeve further comprises a storage groove recessed on the surface of said fitting portion in communication with said sliding space for said positioning portion of said positioning element to be rotated and aligned along said through hole of said docking element in a storage state of lifting displacement, and a limiting shoulder formed at the adjacent position of said sliding space and said storage groove for said positioning portion of said positioning element to form a limiting state.

8. The fixing device as claimed in claim 1, wherein said positioning sleeve is a tube-shaped configuration; said fitting portion is a tube-shaped fitting portion with an enlarged outer diameter externally protruded from one end of said sliding space; said sleeve portion is a tube-shaped sleeve portion externally protruded from an opposite end of said sliding space; said positioning sleeve further comprises a disc-shaped resisting portion provided outside said positioning sleeve adjacent to said tube-shaped fitting portion; said locking portions are rectangular locking portions arranged outside said positioning sleeve adjacent to said tube-shaped sleeve portion.

9. The fixing device as claimed in claim 1, wherein said fitting portion of said positioning sleeve of said positioning mechanism is a tube-shaped fitting portion externally protruded from one end of said sliding space to be fixed in a fitting hole of a preset second panel; said positioning sleeve further comprises a disc-shaped resisting portion provided outside said positioning sleeve adjacent to said tube-shaped fitting portion for resisting the surface of said preset second panel.

10. A fixing device, comprising a docking element, a positioning mechanism and a rotating mechanism, wherein: said docking element comprises a base with a through hole on the surface thereof, and a positioning space formed on one side of said through hole of said base; said positioning mechanism is assembled on said base of said docking element, said positioning mechanism comprising a positioning element, a positioning sleeve and an elastic element, said positioning element comprising a positioning portion located on one end thereof and a perforation provided on an opposite end thereof opposite to said positioning portion, said positioning sleeve being movably sleeved onto said positioning element, said positioning sleeve comprising a sliding space therein for said positioning element to move and wear, a fitting portion externally protruded from one end of said sliding space, a sleeve portion externally protruded from an opposite end of said sliding space to be sleeved with said elastic element, and two locking portions externally provided adjacent to said fitting portion; said rotating mechanism is assembled on said positioning mechanism, said rotating mechanism comprising a rotating sleeve movably mounted on said positioning element and said positioning sleeve, a rotating element movably assembled on said rotating sleeve, and a pivoting element movably inserted between said positioning element and said rotating sleeve and said rotating element, said rotating sleeve comprising an accommodating space therein for said positioning element of said positioning mechanism to be movably inserted, a pivot joint provided on the outside for the pivoting of said rotating element, two pivot joint grooves respectively recessed on said pivot joint on two opposite sides for said pivoting element to be pivoted.

11. The fixing device as claimed in claim 10, wherein said through hole of said docking element is a long rectangular through hole; said positioning element further comprises a long rectangular stop block provided with said positioning portion corresponding to said long rectangular through hole of said docking element; said docking element further comprises two fixing portions respectively and obliquely extending from said base two opposite sides of said through hole, a fixing hole respectively provided on the surface of each of said two fixing portions for fixing on a preset first panel.

12. The fixing device as claimed in claim 10, wherein said rotating element is movably assembled on said pivot joint of said rotating sleeve, said rotating element comprising a wrenching portion, two opposing extension arms extending from one side of said wrenching portion in the same direction, a wrenching space formed between said two opposing extension arms and two through-shaped pivot holes respectively formed on said extension arms in communication with said wrenching space; said pivoting element is inserted through each said through-shaped pivot hole, each said pivot joint groove and said perforation, so that said rotating element forms a movable pivot state.

13. The fixing device as claimed in claim 10, wherein said rotating sleeve further comprises a supporting shoulder formed at an inner wall surface thereof between said accommodating space and said pivot joint; said elastic element is set on said sleeve portion of said positioning sleeve with one end thereof held against the surface of said locking portions and an opposite end thereof held against said supporting shoulder in an elastic deformation state; said rotating sleeve further comprises a through hole located on the side of the accommodating space towards said pivot joint for said positioning element of said positioning mechanism to be movably inserted.

14. The fixing device as claimed in claim 13, wherein said rotating sleeve further comprises two opposite convex portions arranged transversely on two opposite wall surfaces of said accommodating space remote from said pivot joint, two opposing stoppers respectively protruding from convex portions, a channel formed between each said convex portion and each said stopper for said locking portions of said positioning sleeve to rotate and penetrate, and a notch respectively formed on an outer side of each said stopper for said locking portions to be rotated and aligned for lifting and displacement.

15. The fixing device as claimed in claim 10, wherein said positioning sleeve further comprises a storage groove recessed on the surface of said fitting portion in communication with said sliding space for said positioning portion of said positioning element to be rotated and aligned along said through hole of said docking element in a storage state of lifting displacement, and a limiting shoulder formed at the adjacent position of said sliding space and said storage groove for said positioning portion of said positioning element to form a limiting state.

16. The fixing device as claimed in claim 10, wherein said positioning sleeve is a tube-shaped configuration; said fitting portion is a tube-shaped fitting portion with an enlarged outer diameter externally protruding from one end of said sliding space to be fixed in a fitting hole of a preset second panel; said sleeve portion is a tube-shaped sleeve portion externally protruded from an opposite end of said sliding space; said positioning sleeve further comprises a disc-shaped resisting portion provided outside said positioning sleeve adjacent to said tube-shaped fitting portion; said locking portions are rectangular locking portions arranged outside said positioning sleeve adjacent to said tube-shaped sleeve portion.

17. The fixing device as claimed in claim 10, wherein said positioning element is a rod-shaped configuration and further comprises a shank, and said positioning portion is located on one end of said shank and movably worn on said through hole of said docking element to be located in said positioning space for rotational alignment and lifting displacement.

18. The fixing device as claimed in claim 10, wherein said fitting portion of said positioning sleeve of said positioning mechanism is a tube-shaped fitting portion externally protruded from one end of said sliding space to be fixed in a fitting hole of a preset second panel; said positioning sleeve, which is adjacent to said tube-shaped fitting portion, further comprises a disc-shaped resisting portion provided outside for resisting the surface of said preset second panel.

* * * * *